(12) United States Patent
De Gooijer et al.

(10) Patent No.: US 10,145,299 B2
(45) Date of Patent: Dec. 4, 2018

(54) INTERNAL COMBUSTION ENGINE INCLUDING VARIABLE COMPRESSION RATIO

(71) Applicant: GOMECSYS B.V., Naarden (NL)

(72) Inventors: Lambertus Hendrik De Gooijer, Naarden (NL); Sander Wagenaar, Huizen (NL); Willem-Constant Wagenvoort, Huizen (NL)

(73) Assignee: GOMECSYS B.V., Naarden (NL)

( * ) Notice: Subject to any disclaimer, the term of this patent is extended or adjusted under 35 U.S.C. 154(b) by 36 days.

(21) Appl. No.: 15/302,139

(22) PCT Filed: Apr. 8, 2015

(86) PCT No.: PCT/EP2015/057609
§ 371 (c)(1),
(2) Date: Oct. 5, 2016

(87) PCT Pub. No.: WO2015/155233
PCT Pub. Date: Oct. 15, 2015

(65) Prior Publication Data
US 2017/0211471 A1 Jul. 27, 2017

(30) Foreign Application Priority Data
Apr. 8, 2014 (EP) .................................... 14163870

(51) Int. Cl.
*F02B 75/04* (2006.01)
*F02D 15/02* (2006.01)
(Continued)

(52) U.S. Cl.
CPC ............ *F02B 75/048* (2013.01); *F02D 15/02* (2013.01); *F16C 3/06* (2013.01); *F16H 3/46* (2013.01); *F16H 9/26* (2013.01)

(58) Field of Classification Search
CPC ........ F02B 75/048; F02B 75/04; F02D 15/02; F16H 3/46; F16H 9/26
See application file for complete search history.

(56) References Cited

U.S. PATENT DOCUMENTS

| 1,207,429 A | 12/1916 | Morison |
| 1,553,009 A | 9/1925 | Stuke |

(Continued)

FOREIGN PATENT DOCUMENTS

| AU | 7857681 A | 6/1982 |
| CN | 102066719 A | 5/2011 |

(Continued)

OTHER PUBLICATIONS

International Search Report and Written Opinion for International application No. PCT/EP2015/057609, dated Jun. 17, 2015.
(Continued)

*Primary Examiner* — Jacob Amick
(74) *Attorney, Agent, or Firm* — Steven M. Koehler; Westman, Champlin & Koehler, P.A.

(57) ABSTRACT

An engine comprises a crankcase and a crankshaft. The crankshaft has a central main portion, a crankpin and a crankshaft web. A crank member is rotatably and eccentrically mounted on the crankpin. An external crank member gear meshes with an external drive shaft gear. A driven portion of the drive shaft is located at a side of the crankshaft web which is opposite to its side where the crankpin is located and is drivably coupled via a first transmission to an intermediate member which is rotatably mounted to the crankshaft. The intermediate member is drivably coupled to a control shaft portion of a control shaft via a second transmission which control shaft portion is located at axial distance of the driven portion of the drive shaft and the control shaft is rotatable at a fixed rotational position with (Continued)

respect to the crankcase under operating conditions at fixed compression ratio.

15 Claims, 15 Drawing Sheets

(51) Int. Cl.
*F16C 3/06* (2006.01)
*F16H 3/46* (2006.01)
*F16H 9/26* (2006.01)

(56) References Cited

U.S. PATENT DOCUMENTS

| | | | |
|---|---|---|---|
| 1,767,352 A | 6/1930 | Damblanc | |
| 1,964,096 A | 6/1934 | Tucker | |
| 2,271,766 A | 2/1942 | Huebotter | |
| 2,369,747 A | 2/1945 | Munn | |
| 3,686,972 A | 8/1972 | McWhorter | |
| 3,861,239 A * | 1/1975 | McWhorter | F02B 41/04 |
| | | | 123/197.4 |
| 3,886,805 A | 6/1975 | Koderman | |
| 4,073,196 A | 2/1978 | Dell | |
| 4,152,955 A | 5/1979 | McWhorter | |
| 4,179,942 A | 12/1979 | Matthews | |
| 4,237,741 A | 12/1980 | Huf | |
| 4,860,702 A | 8/1989 | Doundoulakis | |
| 5,133,314 A | 7/1992 | Langstroth | |
| 5,170,757 A | 12/1992 | Gamache | |
| 5,482,015 A | 1/1996 | Fish | |
| 5,605,120 A | 2/1997 | Hedelin | |
| 5,611,301 A | 3/1997 | Bergsten | |
| 5,908,014 A * | 6/1999 | Leithinger | F02B 75/048 |
| | | | 123/48 B |
| 5,927,236 A | 7/1999 | Gonzalez | |
| 6,273,052 B1 | 8/2001 | Bresland | |
| 6,349,684 B1 | 2/2002 | De Gooijer | |
| 6,453,869 B1 | 9/2002 | Moore | |
| 6,857,412 B2 | 2/2005 | Ozdamar | |
| 7,011,052 B2 | 3/2006 | Dow | |
| 7,293,542 B2 | 11/2007 | Ozdamar | |
| 8,714,134 B2 | 5/2014 | De Gooijer | |
| 9,279,363 B2 | 3/2016 | Gooijer | |
| 2003/0183026 A1 | 10/2003 | Korniyenko et al. | |
| 2006/0053964 A1 | 3/2006 | Venettozzi | |
| 2009/0133653 A1 | 5/2009 | Duzzie | |
| 2009/0188337 A1 | 7/2009 | Chio | |
| 2011/0036334 A1 | 2/2011 | De Gooijer | |
| 2012/0180583 A1 | 7/2012 | De Gooijer | |
| 2014/0360292 A1 | 12/2014 | Sleper | |

FOREIGN PATENT DOCUMENTS

| | | |
|---|---|---|
| DE | 181913 C | 3/1905 |
| DE | 164819 C | 11/1905 |
| DE | 329861 C | 12/1920 |
| DE | 488059 C | 12/1929 |
| DE | 2947882 A1 | 7/1981 |
| DE | 242077 A | 1/1987 |
| DE | 3634536 A1 | 2/1987 |
| DE | 3642681 A1 | 6/1988 |
| DE | 10230425 A1 | 1/2004 |
| DE | 10230426 A1 | 1/2004 |
| DE | 102011085647 A1 | 5/2013 |
| EP | 0184042 A2 | 6/1986 |
| EP | 0345366 A1 | 12/1989 |
| EP | 1959112 A1 | 8/2008 |
| EP | 2025893 A1 | 2/2009 |
| EP | 2620614 A1 | 7/2013 |
| FR | 636243 A | 4/1928 |
| FR | 861611 A | 2/1941 |
| FR | 986605 A | 8/1951 |
| FR | 1014314 A | 8/1952 |
| FR | 2680402 A1 | 2/1993 |
| GB | 150291 A | 11/1921 |
| GB | 173252 A | 12/1921 |
| GB | 1094649 A | 12/1967 |
| GB | 2258271 A | 2/1993 |
| JP | S49-6364 A | 1/1974 |
| JP | 6113276 | 6/1986 |
| JP | S61132726 A | 6/1986 |
| JP | 61187931 | 11/1986 |
| JP | 361135 | 3/1991 |
| JP | H0422717 A | 1/1992 |
| JP | 10121981 | 10/1996 |
| JP | 2002286020 | 10/2002 |
| JP | 2007113471 A | 5/2007 |
| JP | 200936030 | 2/2009 |
| WO | 8607115 A1 | 12/1986 |
| WO | 9627079 A1 | 9/1996 |
| WO | 9745647 A1 | 12/1997 |
| WO | 9963247 A1 | 12/1999 |
| WO | 02/059503 A1 | 8/2002 |
| WO | 03/098005 A1 | 11/2003 |
| WO | 2006004612 A2 | 1/2006 |
| WO | 2008129025 A1 | 10/2008 |
| WO | 2009018863 A1 | 2/2009 |
| WO | 2009100759 A1 | 8/2009 |
| WO | 20090101173 A1 | 8/2009 |
| WO | 2011006537 A1 | 1/2011 |
| WO | 2013110700 A1 | 8/2013 |
| WO | 20130160501 A1 | 10/2013 |

OTHER PUBLICATIONS

Chinese Office Action for Chinese patent application No. 20130009329.8, dated Apr. 5, 2016.
International Search Report and Written Opinion from the European Patent Office dated May 21, 2013 for International application No. PCT/EP2013/051333, filed on Jan. 24, 2013.
Office Action for U.S. Appl. No. 14/373,470, filed Jul. 21, 2014, dated Dec. 13, 2016.
Final Office Action for U.S. Appl. No. 14/373,470, filed Jul. 21, 2014, dated Apr. 27, 2017.
Advisory Action for U.S. Appl. No. 14/373,470, filed Jul. 21, 2014, dated Aug. 30, 2017.
Office Action for U.S. Appl. No. 14/373,470, filed Jul. 21, 2014, dated Sep. 21, 2017.
Final Office Action for U.S. Appl. No. 14/373,470, filed Jul. 21, 2014, dated Apr. 19, 2018.
Notice of Allowance for U.S. Appl. No. 14/373,470, filed Jul. 21, 2014, dated Jun. 15, 2018.

* cited by examiner

INTERNAL COMBUSTION ENGINE INCLUDING VARIABLE COMPRESSION RATIO

CROSS-REFERENCE TO RELATED APPLICATION

The present application is a national stage filing of International patent application Serial No. PCT/EP2015/057609, filed Apr. 8, 2015, and published as WO 2015/155233 A1 on Oct. 15, 2015.

BACKGROUND

The discussion below is merely provided for general background information and is not intended to be used as an aid in determining the scope of the claimed subject matter.

Aspects of the present invention pertain to an internal combustion engine including variable compression ratio.

An engine with variable compression ratio is well-known in the field of spark-ignition engines. It provides the opportunity to operate the engine at high efficiency, particularly under part-load conditions. Increasing the compression ratio leads to decreasing fuel consumption. At high-load or full-load the compression ratio must be lowered in order to avoid knocking. Several earlier applications of the applicant disclose internal combustion engines with variable compression ratio, for example WO 2013/110700.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An engine includes a relatively simple mechanism at the side of the crankshaft web where the crankpin is located since the crank member gear directly meshes with the drive shaft gear without the presence of an intermediate gear between the crank member gear and the drive shaft gear. This simplifies the manufacturing and assembly process of the crankshaft. The engine does comprise the intermediate member, but this is located at a side of the crankshaft web which is opposite to its side where the crankpin is located. The intermediate member is drivably coupled to both the driven portion of the drive shaft and the control shaft portion of the control shaft. Due to the axial distance between the driven portion and the control shaft portion the first and second transmission can be configured in a compact way at the side of the crankshaft web opposite to its side where the crankpin is located.

The drive shaft may extend through the central main portion of the crankshaft such that it extends both through the crankshaft web and the central main portion.

The drive shaft may extend concentrically through the central main portion of the crankshaft. In that case the center of the drive shaft coincides with the crankshaft axis.

In a practical embodiment the first transmission is formed by an external transfer gear that is fixed to the drive shaft at its driven portion, an external rear intermediate gear that is fixed to the intermediate member and an external reverse gear which meshes with both the transfer gear and the rear intermediate gear, wherein the reverse gear is rotatably mounted to the crankshaft and rotatable with respect to the crankshaft about a reverse gear axis extending parallel to the crankshaft axis and the intermediate member axis.

Furthermore, the second transmission may be formed by an external control member gear which is fixed to the control shaft at its control shaft portion and an external front intermediate gear that is fixed to the intermediate member and meshes with the control member gear.

The first transmission may extend in a first plane and the second transmission may extend in a second plane extending parallel to the first plane.

When the gear ratio between the drive shaft gear and the crank member gear times the gear ratio between the rear intermediate gear and the transfer gear times the gear ratio between the control member gear and the front intermediate gear is 0.5, the crank member rotates at a rotation frequency with respect to the crankcase which is half of that of the crankshaft and in the same rotational direction as the crankshaft as seen from the crankcase under operating conditions in which the control shaft has a fixed rotational position with respect to the crankcase, i.e. when the engine runs at fixed compression ratio.

The rear intermediate gear and the front intermediate gear may have the same number of teeth. Besides, the rear intermediate gear and the front intermediate gear may form a common intermediate gear such that the intermediate member including the front and rear intermediate gears can be made of one piece.

In an advantageous embodiment the transfer gear and the drive shaft gear have the same number of teeth. In this case the gear ratio between the control member gear and the crank member gear is 0.5, whereas the number of teeth of the other gears can be selected freely.

For example, the dimensions can be selected such that the control member gear at least partly overlaps the reverse gear. Hence, when viewing to the front side of the engine, the reverse gear may be partly hidden behind the control member gear. This provides the opportunity to build the first and second transmission in a compact manner as seen in radial direction of the crankshaft axis.

The first transmission and second transmission may be located beyond the central main portion as seen from the crankshaft web, wherein the intermediate member is rotatably mounted to a wheel which is fixed to the central main portion of the crankshaft. In this case the wheel including the intermediate member can be prepared for efficient assembly of the crankshaft.

Preferably, the wheel comprises a pulley for driving auxiliary devices of the engine, whereas the first transmission and second transmission are at least partially accommodated within the pulley, since this combination improves the compactness of the engine further.

The wheel or pulley may be provided with an intermediate gear shaft and a reverse gear shaft which extend parallel to the crankshaft axis and to which the intermediate gear and the reverse gear are rotatably mounted, respectively.

In an alternative embodiment the first transmission comprises an endless belt, such as a toothed belt or chain, through which the intermediate member and the driven portion are coupled, whereas the second transmission is formed by an external control member gear which is fixed to the control shaft at its control shaft portion and an external front intermediate gear that is fixed to the intermediate member and meshes with the control member gear. In another alternative embodiment the first transmission is formed by an external transfer gear which is fixed to the drive shaft at its driven portion and an external rear intermediate gear that is fixed to the intermediate member and meshes with the transfer gear, whereas the second transmission comprises an endless belt, such as a toothed belt or chain, through which the intermediate member and the control shaft portion are coupled.

BRIEF DESCRIPTION OF THE DRAWINGS

Aspects of the invention will hereafter be elucidated with reference to the schematic drawings showing embodiments of the invention by way of example.

DETAILED DESCRIPTION OF THE ILLUSTRATIVE EMBODIMENTS

Figure 1:
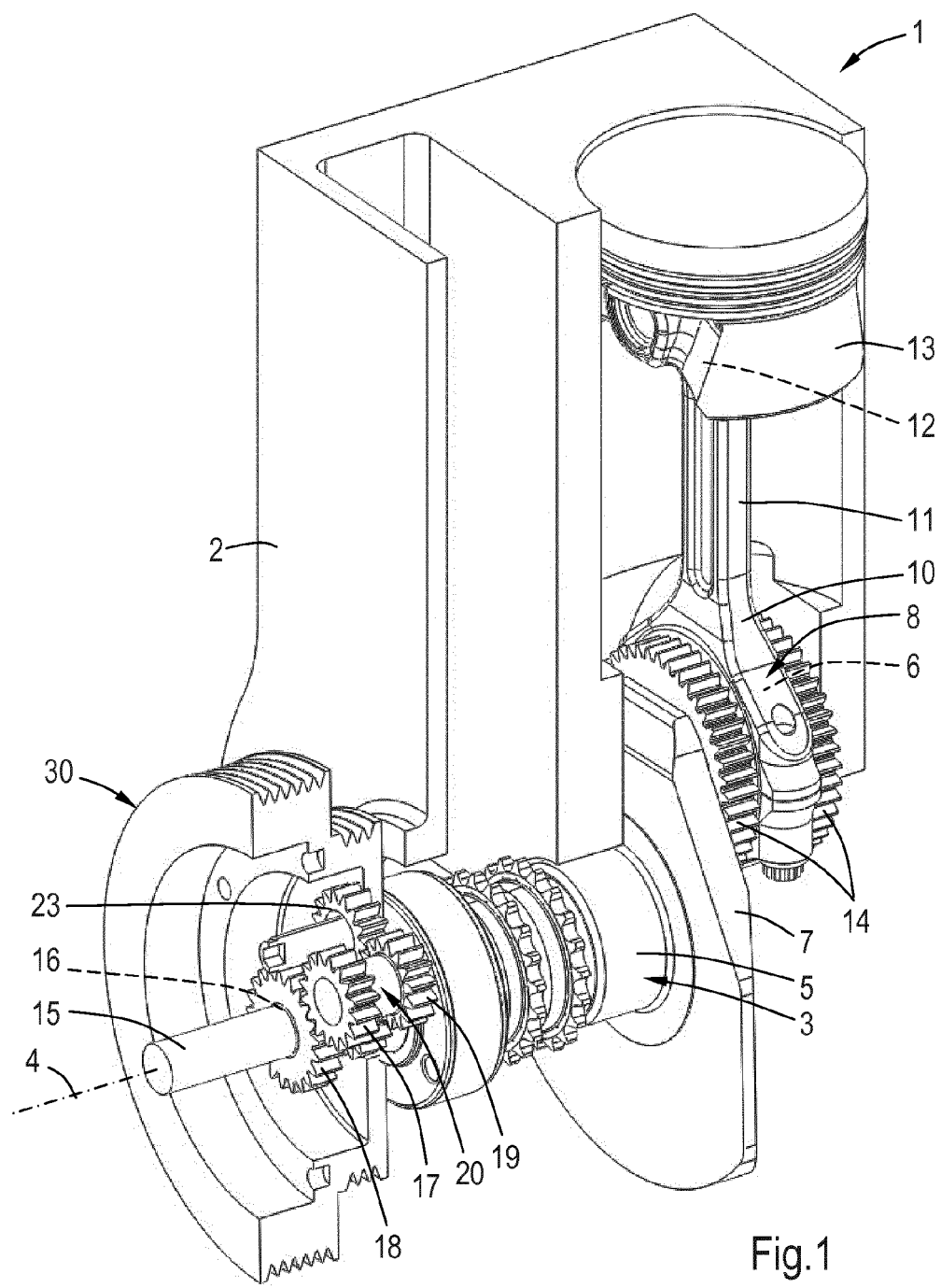
FIG. 1 is a perspective cut-away view of a part of an embodiment of an internal combustion engine.

FIG. 1 shows a part of an embodiment of an internal combustion engine 1. FIGS. 2-5 show details of the front part of the engine 1. The engine 1 is a four-stroke engine and has a variable compression ratio which provides the opportunity to operate the engine 1 at high compression ratio under part-load conditions resulting in improved efficiency. Under high-load conditions the compression ratio can be lowered in order to avoid knocking. The engine 1 comprises a crankcase 2, which supports a crankshaft 3 by crankshaft bearings. The crankshaft 3 has a crankshaft axis 4 and is rotatable with respect to the crankcase 2 about the crankshaft axis 4.

The crankshaft 3 comprises a central main portion 5, a crankpin 6 and a crankshaft web 7. The crankshaft web 7 is located between the central main portion 5 and the crankpin 6 as seen along the crankshaft axis 4. It is noted that in FIG. 1 the left side is a front side of the engine 1. Thus, the central main portion 5 projects from the crankcase 2 at the front side of the engine 1. At the opposite rear side of the engine 1 a flywheel (not shown) is fixed to the crankshaft 3. Although FIG. 1 shows a single cylinder the engine 1 may be a multi-cylinder engine.

The engine 1 comprises a crank member 8 which is rotatably mounted on the crankpin 6. The crank member 8 is provided with a bearing portion 9 which is disposed eccentrically with respect to the crankpin 6, see FIG. 3. The bearing portion 9 has an outer circumferential wall which bears a big end 10 of a connecting rod 11. Thus, the connecting rod 11 is rotatably mounted on the crank member 8 via its big end 10. The connecting rod 11 also includes a small end 12 to which a piston 13 is rotatably connected.

The crank member 8 is provided with two external crank member gears 14 at both sides of the bearing portion 9. The crank member gear 14 located closest to the front side of the engine 1 is drivably coupled to a control shaft 15 for varying the rotational position of the crank member 8 at virtual standstill of the crankshaft 3 under operating conditions. The control shaft 15 is rotatable with respect to the crankcase 2 about the crankshaft axis 4. The control shaft 15 has a fixed rotational position with respect to the crankcase 2 under operating conditions at fixed compression ratio. The control shaft 15 can be turned by means of a worm gear transmission, for example, but numerous alternative driving means are conceivable. The other crank member gear 14 of the crank member 8 is drivably coupled to a next crank member at a next crankpin (which are not shown in the drawings), in order to cause all crank members of the engine 1 to be operated similarly.

The control shaft 15 is provided with a control member gear 18 at a control shaft portion 16 of the control shaft 15. The control member gear 18 meshes with a front intermediate gear 17. The front intermediate gear 17 is part of an intermediate member 20 which is rotatable about an intermediate member axis 21. The intermediate member 20 is rotatably mounted to an intermediate member shaft 22. The intermediate member 20 is also provided with a rear intermediate gear 19 located at an axial distance from the front intermediate gear 17, in this case behind the front intermediate gear 17 as seen from the front side of the engine 1.

The rear intermediate gear 19 meshes with a reverse gear 23. The reverse gear 23 is rotatably mounted to a reverse gear shaft 24 and rotatable about a reverse gear axis 25.

The reverse gear 23 meshes with a transfer gear 26, which is fixed to a drive shaft 27 at a driven portion 28 thereof. The drive shaft 27 extends concentrically through the central main portion 5 and the crankshaft web 7. The driven portion 28 projects from the central main portion 5 of the crankshaft 3 at a side of the crankshaft web 7 which is opposite to its side where the crankpin 6 is located. At a side of the crankshaft web 7 where the crankpin 6 is located an external drive shaft gear 29 is fixed to the drive shaft 27, see FIG. 3. The drive shaft gear 29 meshes with the crank member gear 14 that is located closest to the front side of the engine 1.

The drive shaft 27 is rotatable with respect to the crankshaft 3 about the crankshaft axis 4 in this case. In an alternative embodiment it may rotate about a drive shaft axis that extends parallel to the crankshaft axis 4, i.e. which extends off center. The control shaft 15 must be rotated about the crankshaft axis 4.

The transfer gear 26, the reverse gear 23 and the rear intermediate gear 19 form a first transmission through which the driven portion 28 of the drive shaft 27 is drivably coupled to the intermediate member 20. The mutually meshing gears 26, 23, 19 of the first transmission lie in a first plane perpendicular to the crankshaft axis 4.

The control member gear 18 and the front intermediate gear 17 of the intermediate member 20 meshing with the control member gear 18 form a second transmission through which the control shaft portion 16 is drivably coupled to the intermediate member 20. The mutually meshing gears 17 and 18 of the second transmission lie in a second plane which extends parallel to the first plane. The control shaft portion 16 at the control member gear 18 is located at axial distance of the driven portion 28 at the transfer gear 26. The gap between the control member gear 18 and the transfer gear 26 may be very small in order to build the engine 1 compactly in its longitudinal direction.

Figure 2:
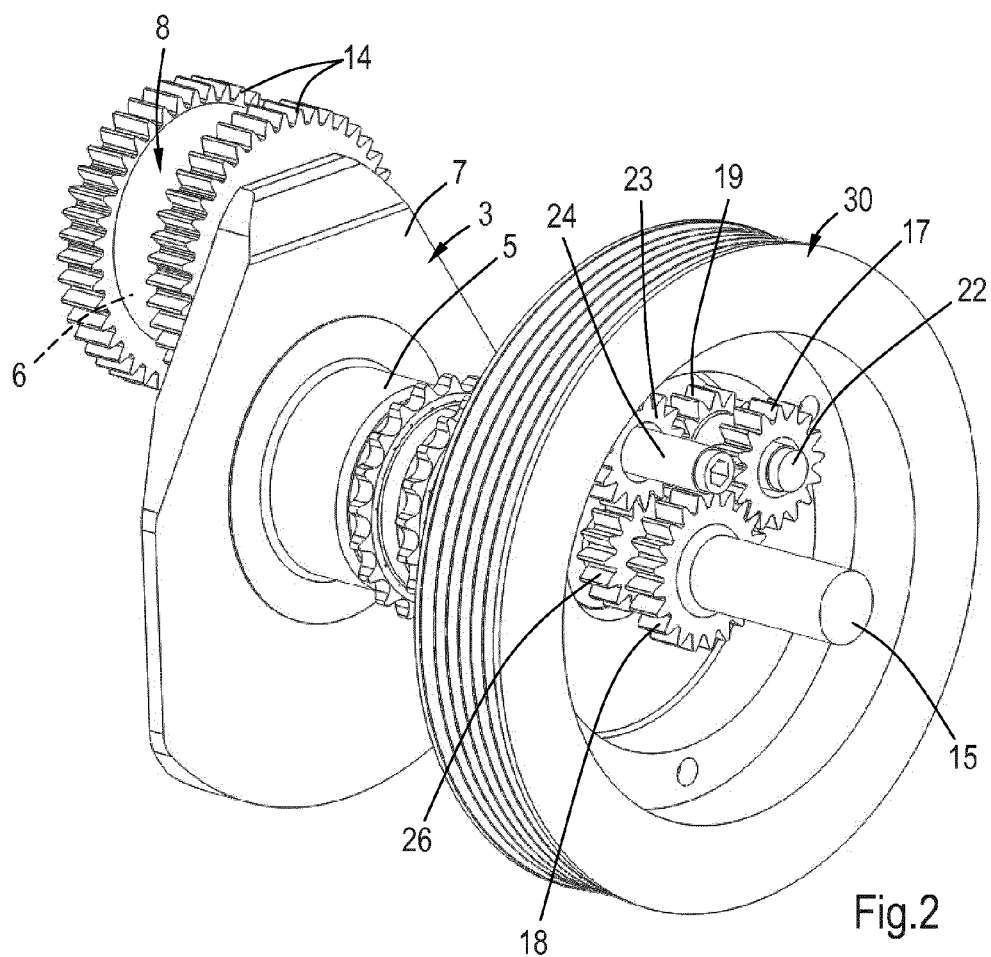
FIG. 2 is a similar view as FIG. 1, but showing a part thereof on a larger scale and from a different side.
Figure 3:
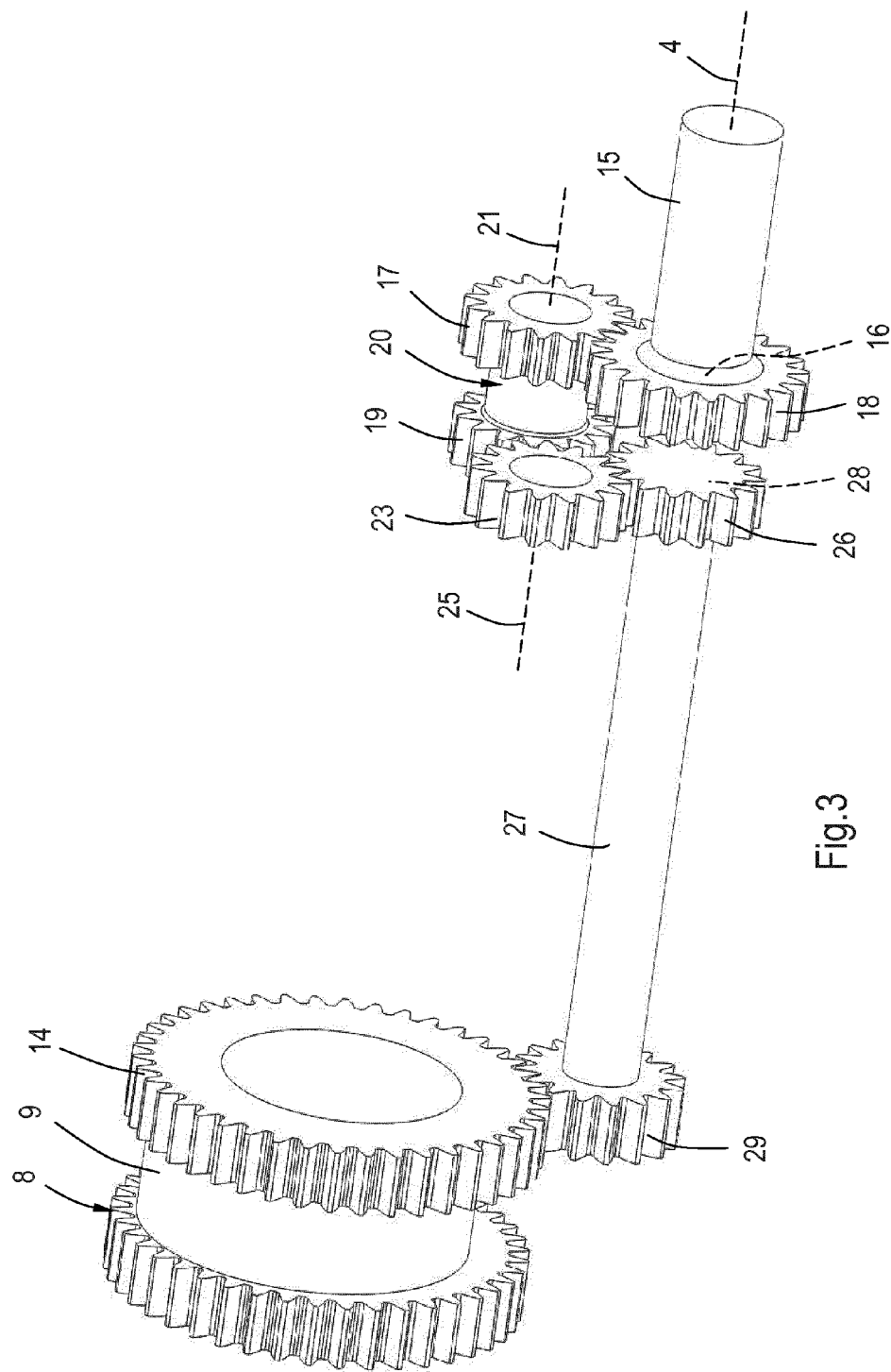
FIG. 3 is a similar view as FIG. 2, but showing a part thereof on a larger scale.

FIG. 2 shows that the intermediate member shaft 22 and the reverse gear shaft 24 are part of a pulley 30. The intermediate member shaft 22 and the third gear shaft 24 extend parallel to each other and to the crankshaft axis 4. The pulley 30 has an outer circumference for driving a belt so as to drive auxiliary devices of the engine 1. The pulley 30 is fixed to the central main portion 5 of the crankshaft 3. FIG. 2 shows that the control member gear 18, the transfer gear 26, the intermediate member 20 and the reverse gear 23 are substantially accommodated within a central recess of the pulley 30.

In the embodiment as shown in FIG. 1-5 the number of teeth of the crank member gear 14 is 42, of the drive shaft gear 29 is 16, of the transfer gear 26 is 15, of the reverse gear 23 is 15, of the rear intermediate gear 19 is 15, of the front intermediate gear 17 is 16, and of the control member gear 18 is 21. This means that the gear ratio between the drive shaft gear 29 and the crank member gear 14 is 16/42, the gear ratio between the rear intermediate gear 19 and the transfer gear 26 is 1, and the gear ratio between the control member gear 18 and the front intermediate gear 17 is 21/16. The product of these gear ratios is 0.5. Consequently, under operating conditions, if the control member gear 18 has a fixed position the crank member 8 rotates at a rotation frequency with respect to the crankcase 2 which is half of that of the crankshaft 3 and in the same rotational direction as the crankshaft 3 as seen from the crankcase 2.

Figure 4:
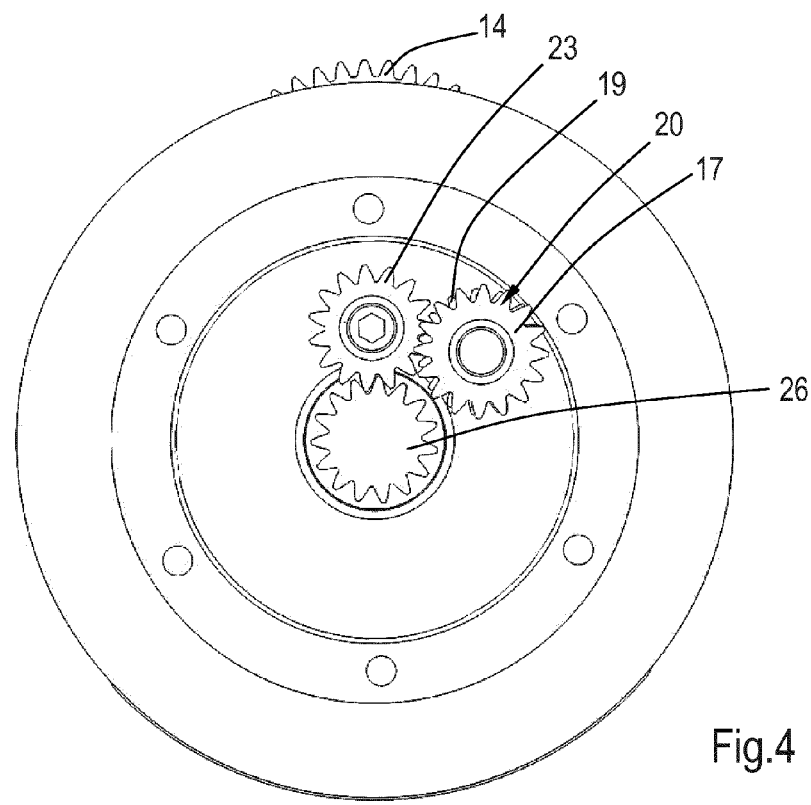
FIGS. 4 and 5 are side views of the embodiment as shown in FIG. 2, wherein in FIG. 4 the control member gear is omitted.
Figure 5:
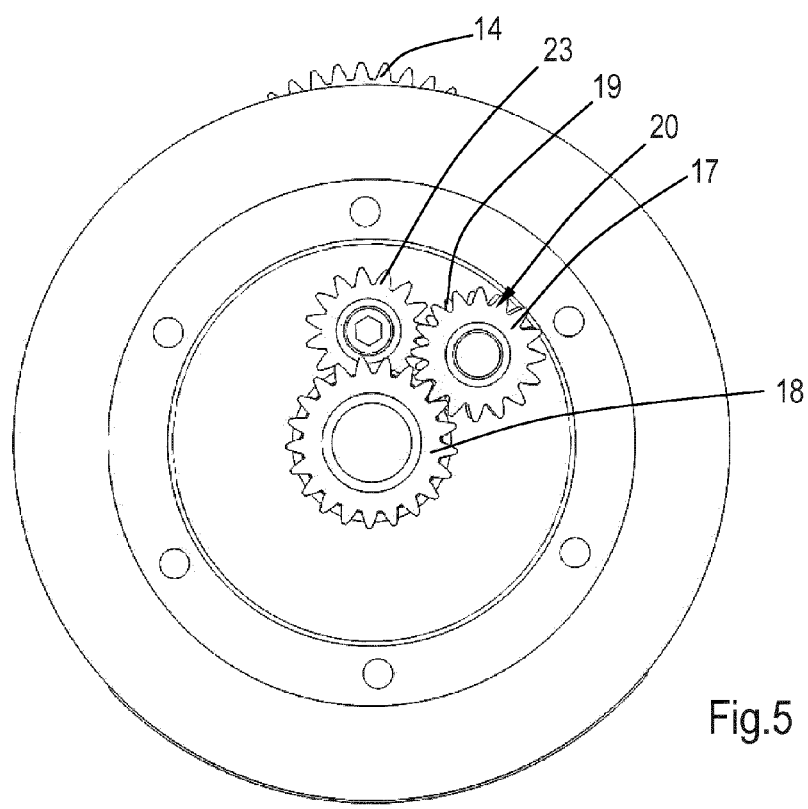

FIG. 5 shows that the control member gear 18 overlaps the transfer gear 26 and a part of the reverse gear 23. This is illustrated in FIG. 4 where the control member gear 18 is omitted.

Figure 6:
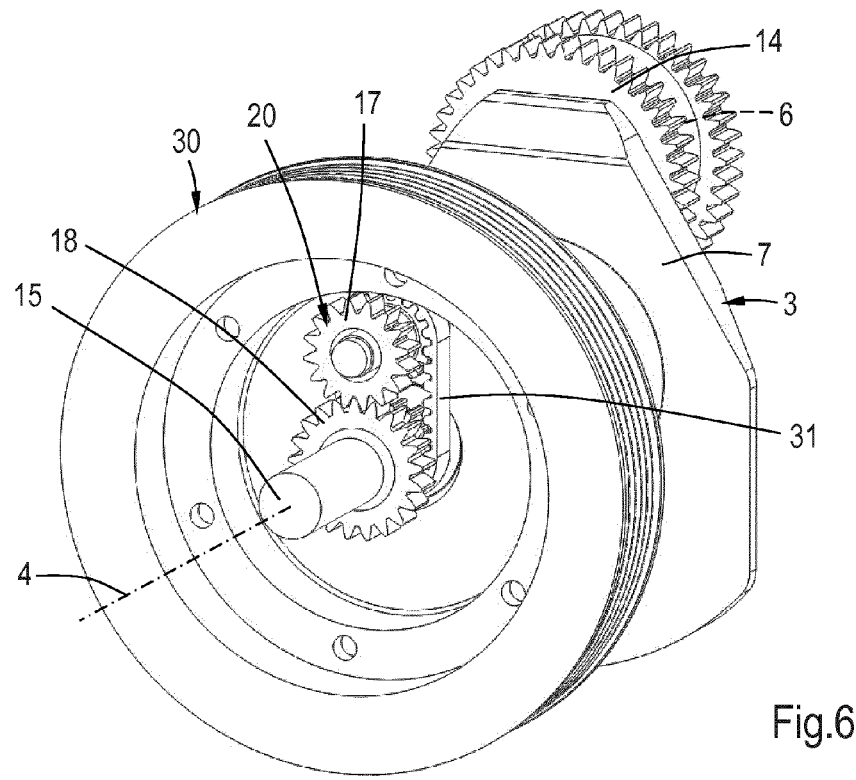
FIGS. 6 and 7 are similar views as FIG. 2 of an alternative embodiment.
Figure 7:
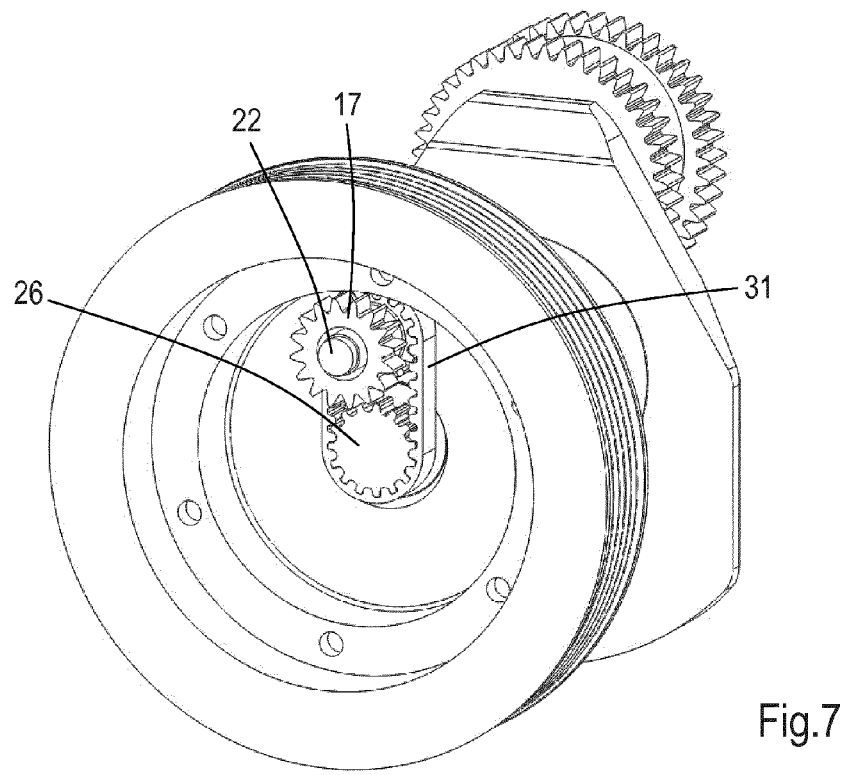
Figure 8:
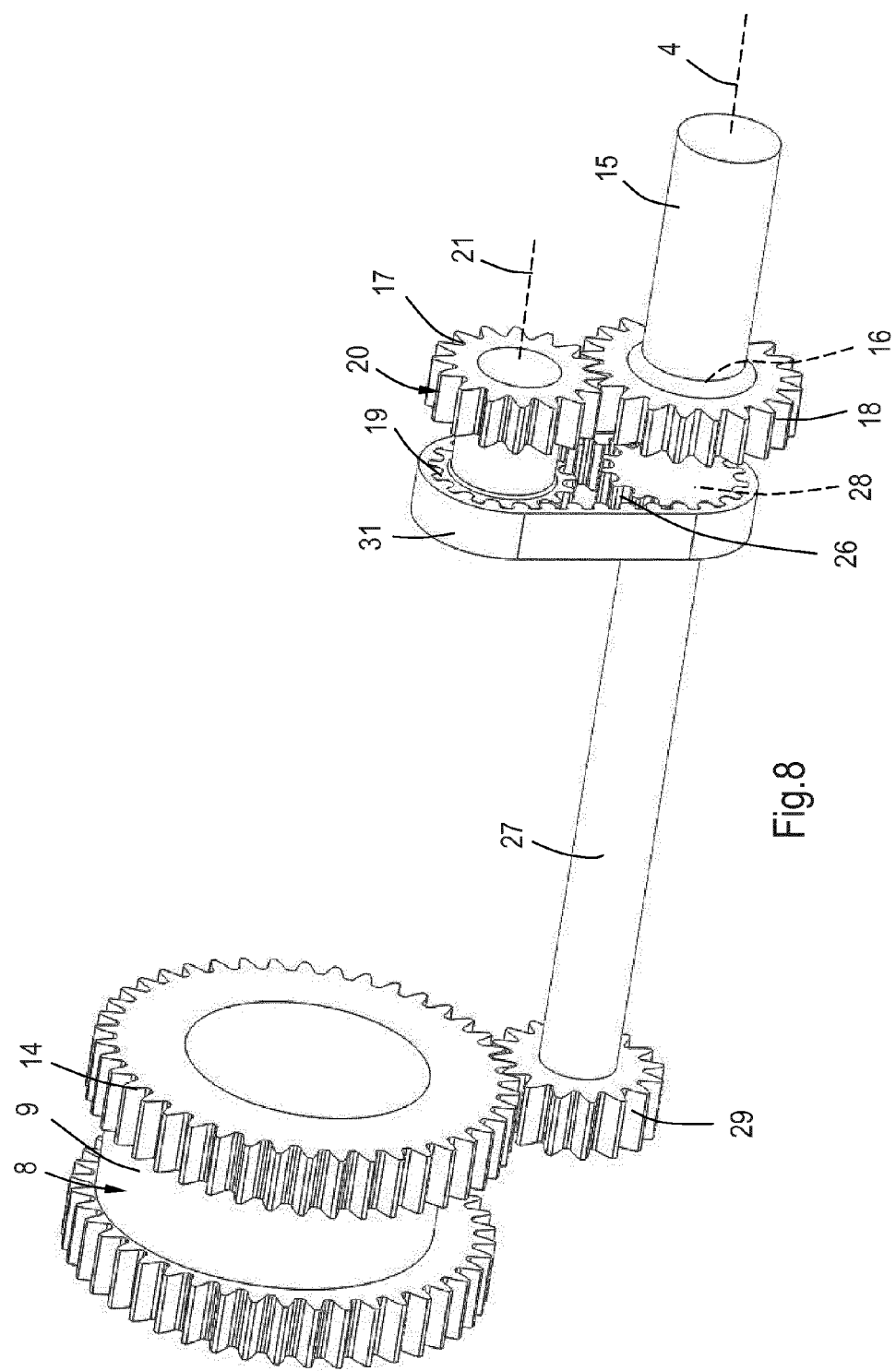
FIG. 8 is a similar view as FIG. 3 of the alternative embodiment as shown in FIGS. 6 and 7.

FIGS. 6-8 show an alternative embodiment of the engine 1. Parts that are similar to those in FIGS. 1-7 have the same reference signs. The embodiment of FIGS. 6-8 is also provided with an intermediate member 20 which is rotatably mounted to an intermediate member shaft 22 and the front intermediate gear 17 meshes with the control member gear 18. Hence, the second transmission through which the control shaft portion 16 is drivably coupled to the intermediate member 20 is similar to the embodiment as shown in FIGS. 1-5. However, the first transmission is different. In this case the first transmission is formed by the transfer gear 26, the rear intermediate gear 19 and a toothed belt 31 which engages the transfer gear 26 and the rear intermediate gear 19. Due to this configuration a reverse gear between the transfer gear 26 and the rear intermediate gear 19 is eliminated.

The transfer gear 26 and the rear intermediate gear 19 may be toothed wheels. Alternatively, the transfer gear 26 and the rear intermediate gear 19 may be replaced by sprockets and the toothed belt 31 may be replaced by a chain. It is also possible to change the location of the first and second transmission such that the second transmission lies behind the first transmission as seen from the front side of the engine 1.

FIGS. 9-14 show still another alternative embodiment. This embodiment is basically similar to the embodiment as shown in FIGS. 1-5, but comprises three intermediate members 20 including three front intermediate gears 17 and three rear intermediate gears 19. The intermediate members 20 are rotatably mounted to respective intermediate member shafts 22, which are part of the pulley 30 and located at equidistant angles about the crankshaft axis 4. The front intermediate gear 17 and the rear intermediate gear 19 of each of the intermediate members 20 are integral common intermediate gears, respectively. This means that they automatically have the same number of teeth. The front portions of these common intermediate gears mesh with the control member gear 18, whereas their rear portions mesh with respective reverse gears 23. The three reverse gears 23 mesh with the transfer gear 26. It will be clear that the engine 1 may have less or more than three intermediate members 20.

In the embodiment as shown in FIGS. 9-14 the number of teeth of the drive shaft gear 29 and the transfer gear 26 are equal and the gear ratio between the control member gear 18 and the crank member gear 14 is 0.5. Consequently, under operating conditions, if the control member gear 18 has a fixed rotational position the crank member 8 rotates at a rotation frequency with respect to the crankcase 2 which is half of that of the crankshaft 3 and in the same rotational direction as the crankshaft 3 as seen from the crankcase 2. It is noted that the number of teeth of the reverse gears 23, the drive shaft gear 29, the transfer gear 26, the common intermediate gear 17, 19 may be freely selected for this rotation behaviour of the crank member 8, as long as the number of teeth of the drive shaft gear 29 and the transfer gear 26 are equal. This provides a great freedom of engineering.

Figure 9:
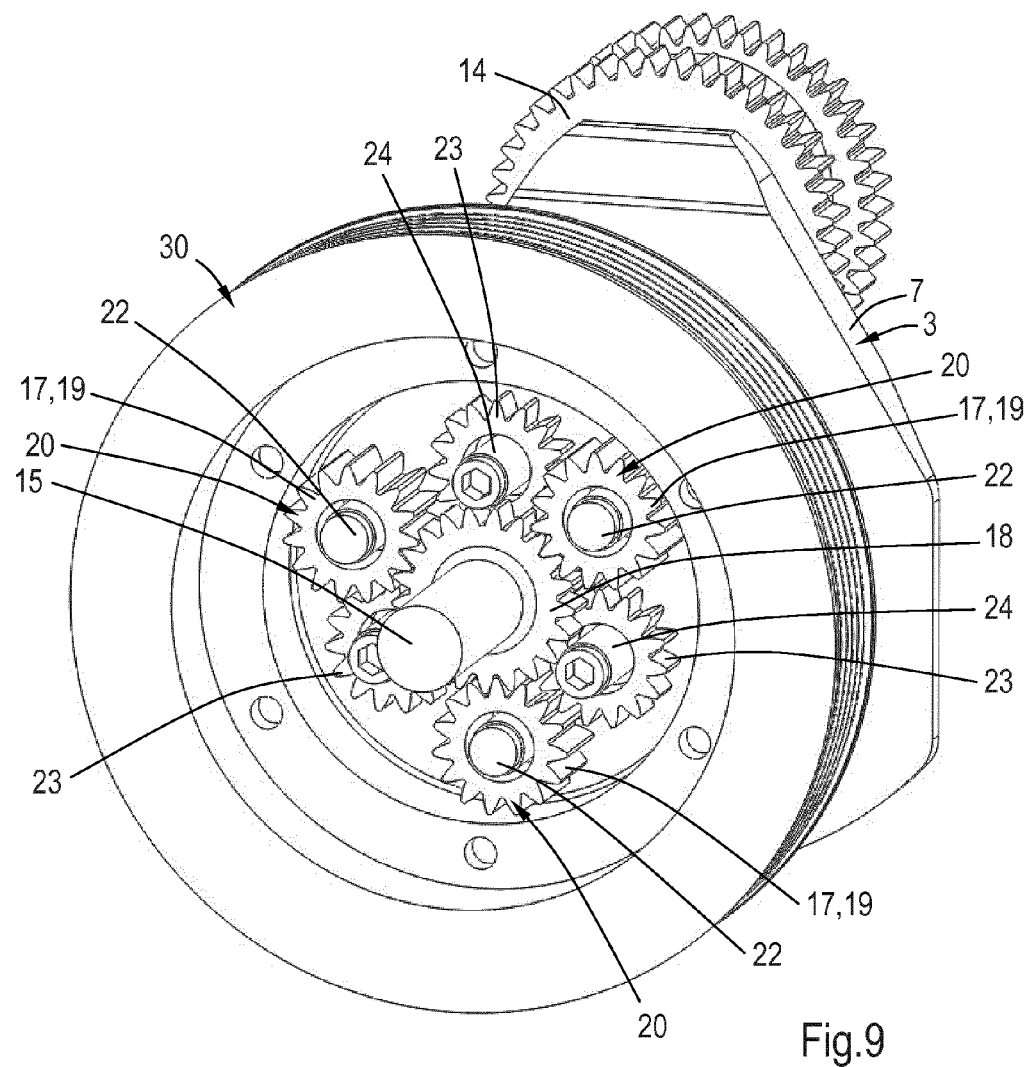
FIGS. 9-13 are similar views as FIGS. 6 and 7 of another alternative embodiment.

Referring to FIG. 9 the dimensions of the gears are selected such that the control member gear 18 entirely overlaps the transfer gear 26 and partly overlaps the reverse gears 23. Hence, the feature that the first transmission and the second transmission extend in two parallel planes provides the opportunity to build both transmissions in a compact way in radial direction of the crankshaft axis, in this case even accommodated within a central recess of the pulley 30.

Figure 10:
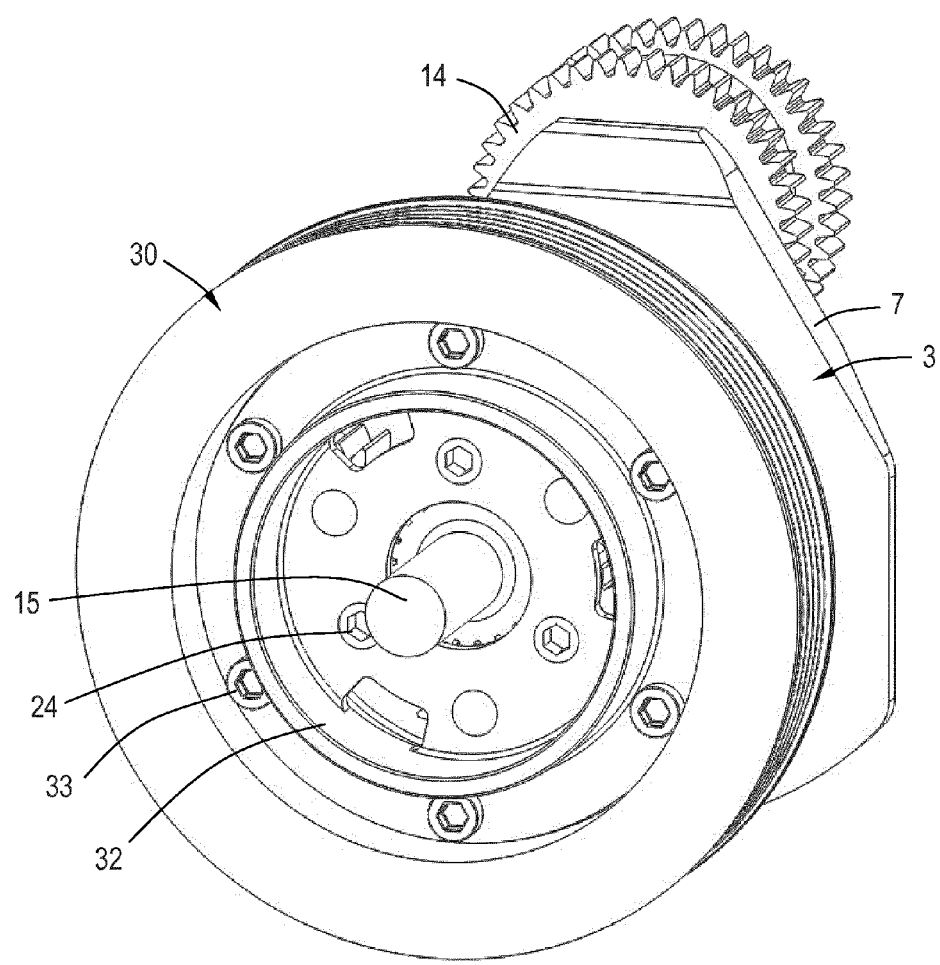
Figure 11:
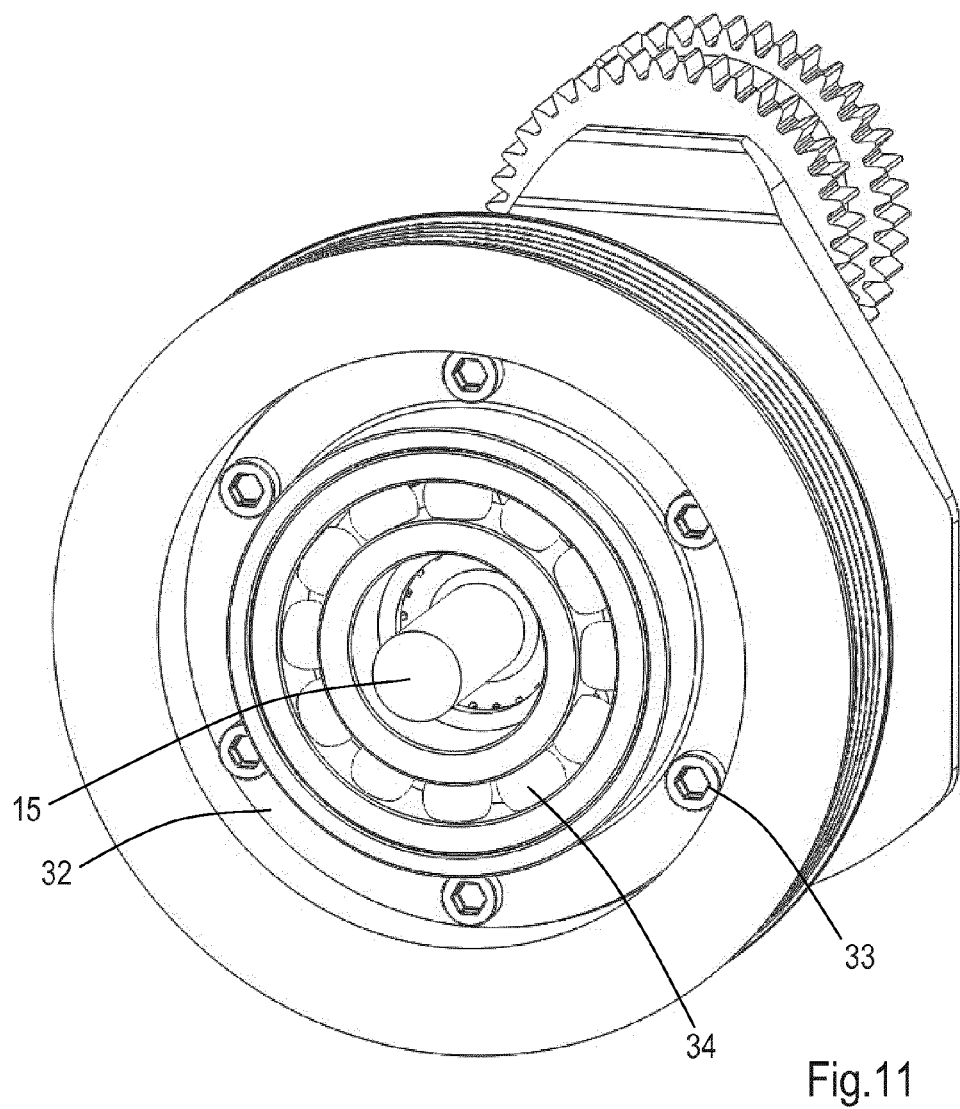
Figure 12:
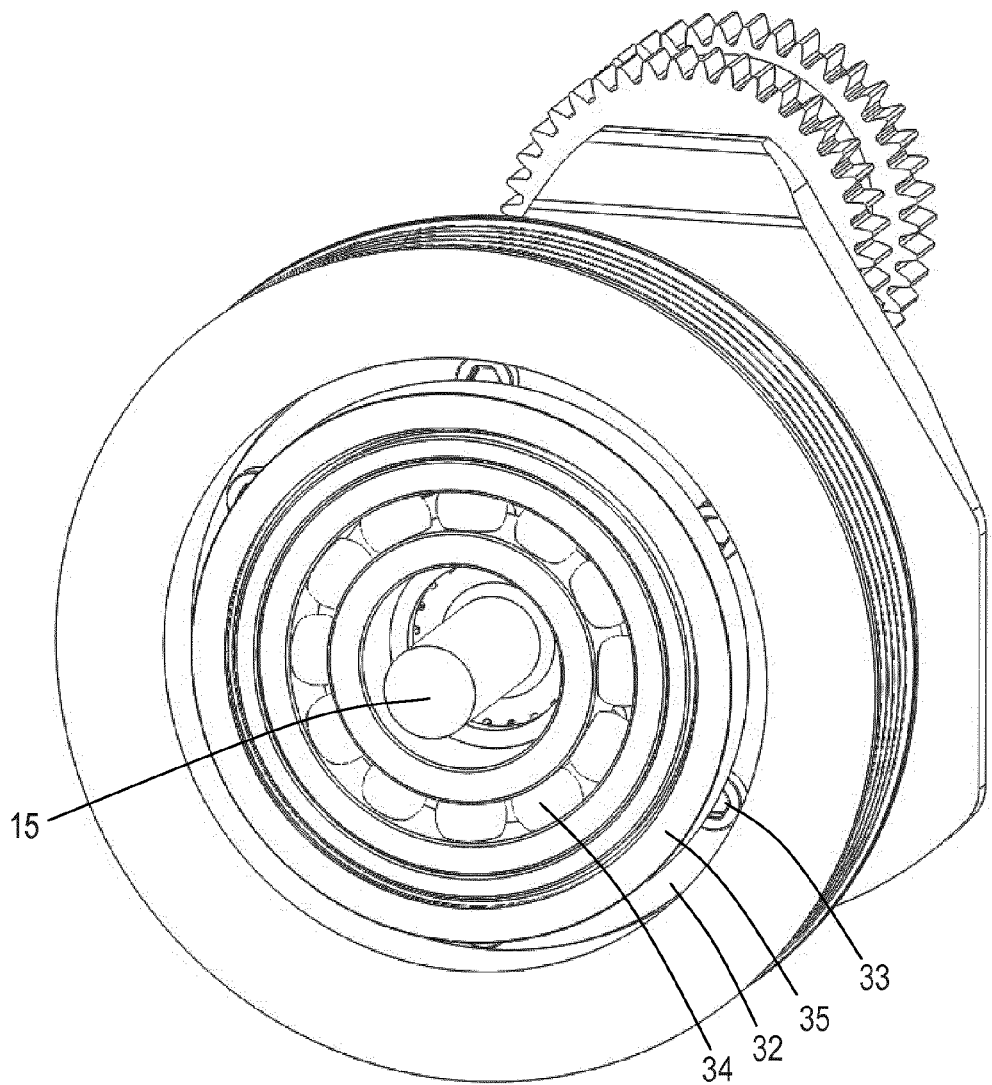
Figure 13:
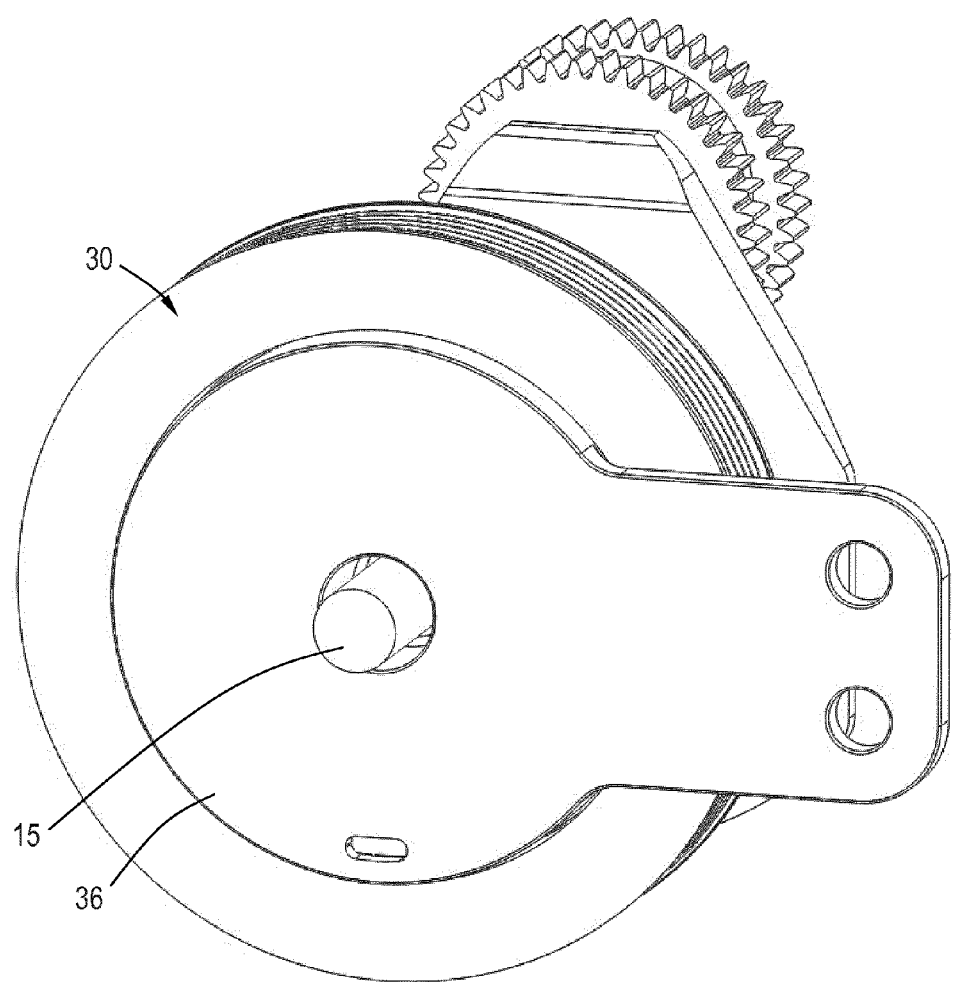
Figure 14:
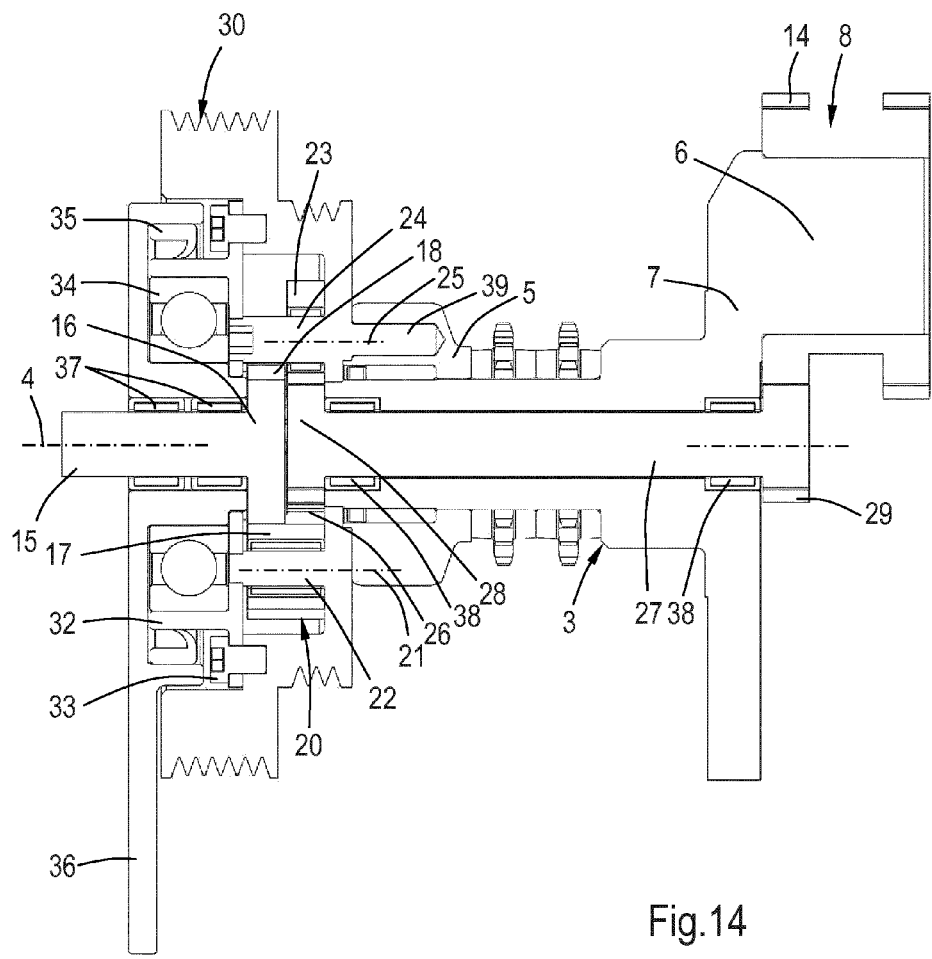
FIG. 14 is a sectional view of the embodiment as shown in FIG. 13.

FIGS. 10-14 show further details of the engine 1 for closing-off the first and second transmission such that lubricant from the interior of the engine 1 can flow to both transmissions. FIG. 10 shows that a bearing support 32 is fixed to the pulley 30 by means of bolts 33. A roller bearing 34 is mounted to the bearing support 32 as shown in FIG. 11. Finally, a cover 36 including an oil seal ring 35 is mounted to the crankcase 2, see FIGS. 12 and 13. FIG. 14 shows that the oil seal ring 35 envelopes a circumferential wall of the roller bearing 34. The cover 36 supports the pulley 30 through the roller bearing 34.

FIG. 14 shows that the control shaft 15 is supported by the cover 36 by means of needle bearings 37, whereas the drive shaft 27 is supported in the central main portion 5 of the crankshaft 3 by means of needle bearings 38, as well. In order to keep the control shaft aligned with the crankshaft axis 4 under operating conditions, the cover 36 is mounted to the crankcase 2 via resilient elements; consequently the cover 36 including the control shaft 15 may follow any vibrations of the crankshaft 3. Furthermore, FIG. 14 illustrates that the pulley 30 is fixed to the crankshaft 3 by means of bolts 39.

Figure 15:
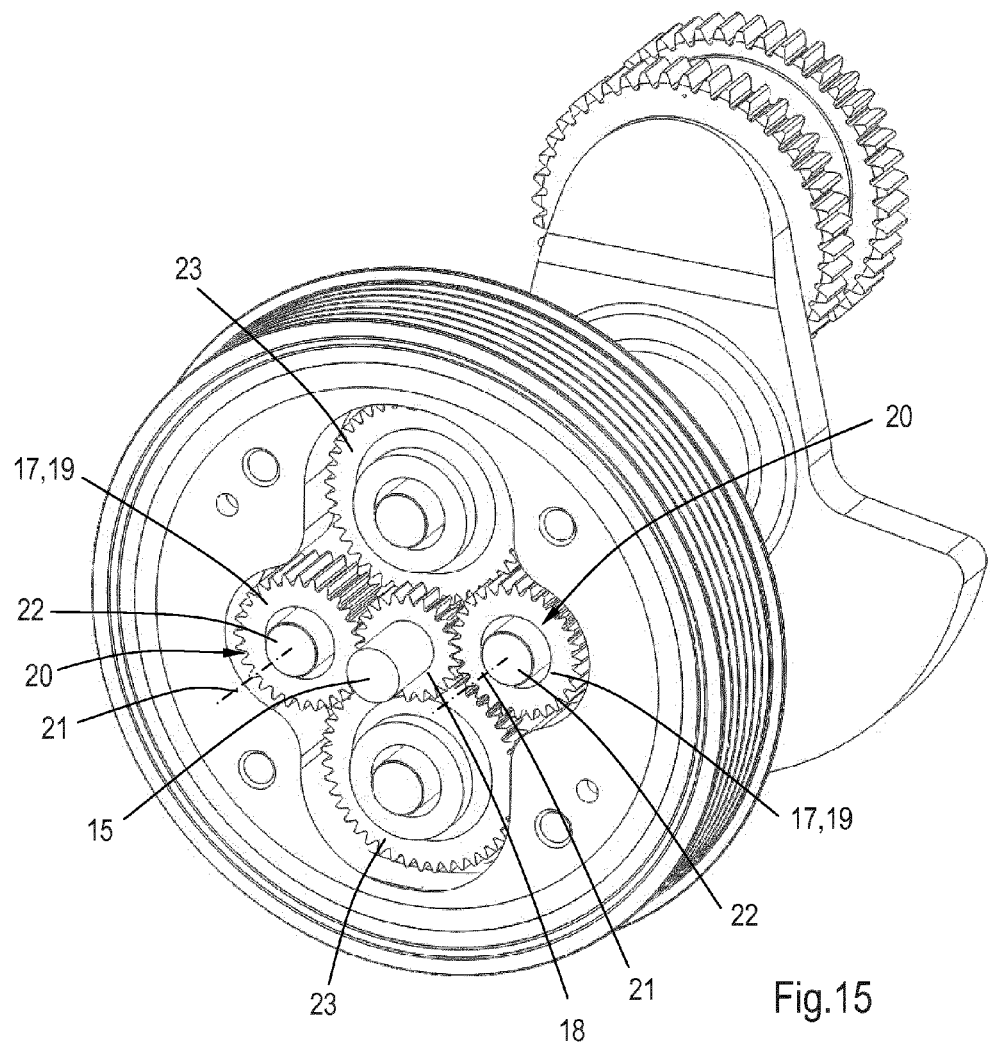
FIGS. 15-17 are similar views as FIGS. 6 and 7 of still another alternative embodiment.
Figure 16:
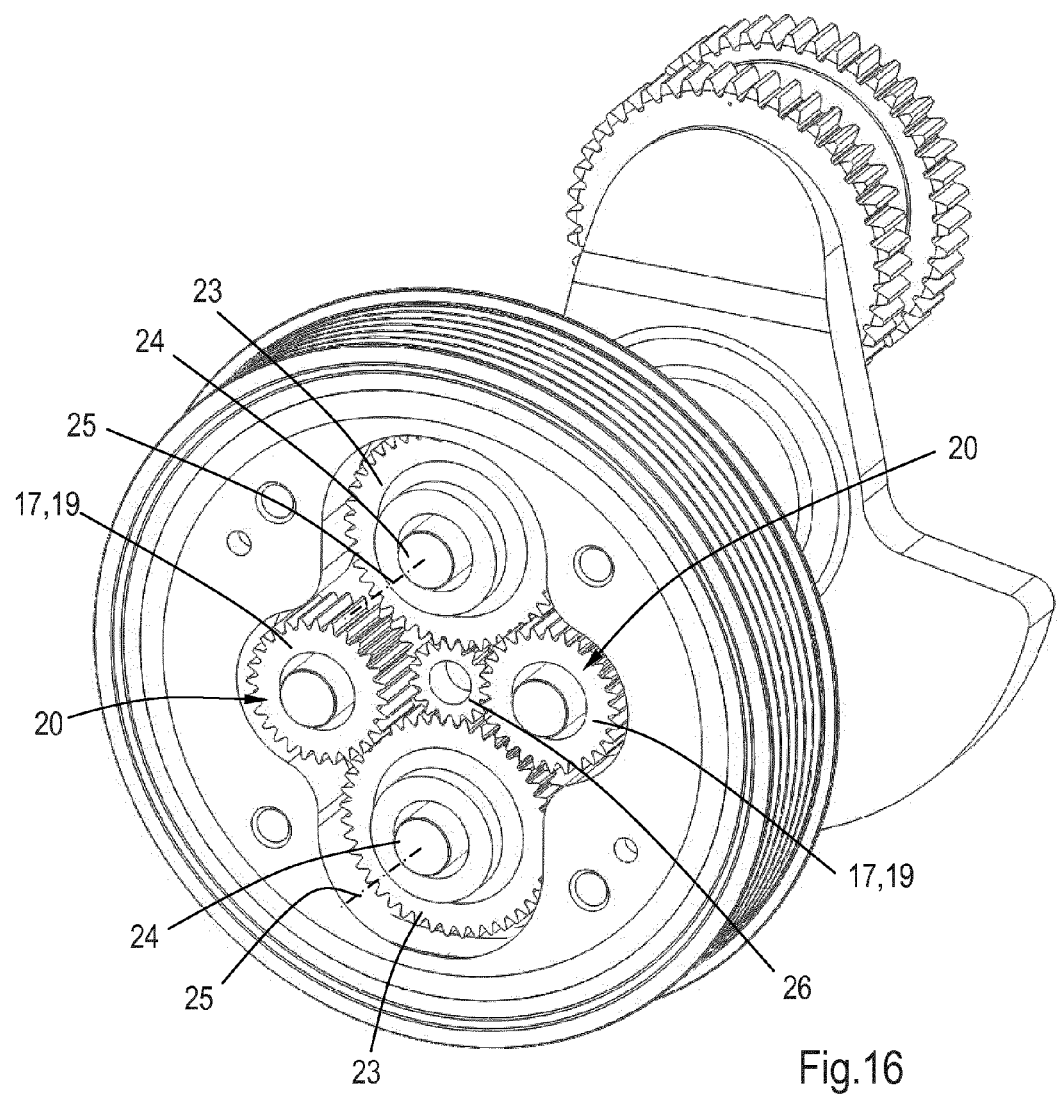
Figure 17:
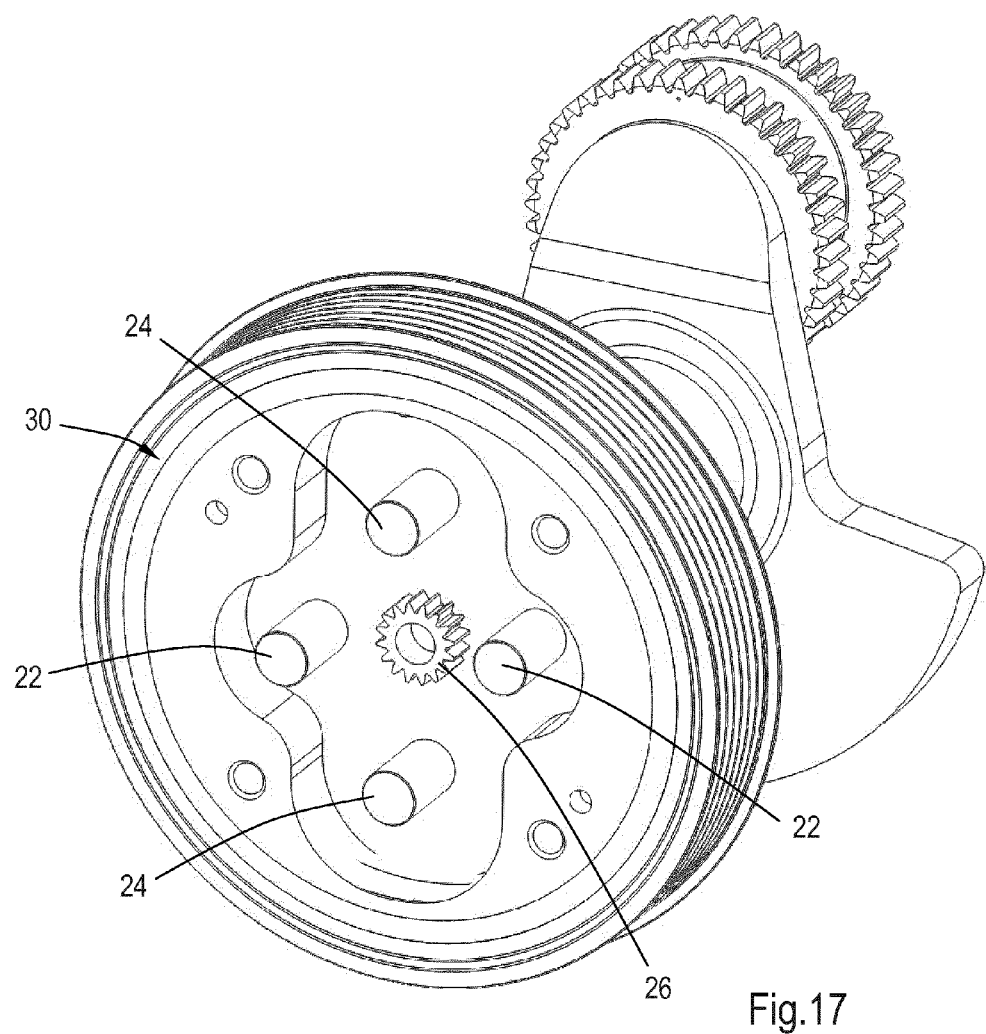

FIGS. 15-17 show still another alternative embodiment. This embodiment comprises two intermediate members 20. The intermediate members 20 are rotatably mounted to respective intermediate member shafts 22, which are part of the pulley 30 and located at opposite sides of the crankshaft axis 4. The front intermediate gear 17 and the rear intermediate gear 19 of each of the intermediate members 20 form an integral common intermediate gear 17, 19. This means that they automatically have the same number of teeth. The front portions of these common intermediate gears mesh with the control member gear 18 whereas their rear portions mesh with respective reverse gears 23. The two reverse gears 23 mesh with the transfer gear 26. This is shown in FIG. 16 where the control member gear 18 is omitted. FIG.

17 illustrates the embodiment of the pulley 30 having two intermediate member shafts 22 and two reverse gear shafts 24.

From the foregoing, it will be clear that the invention provides a compact driving mechanism for rotating the crank member.

The invention is not limited to the embodiments shown in the drawings and described hereinbefore, which may be varied in different manners within the scope of the claims and their technical equivalents.

The invention claimed is:

1. An internal combustion engine including variable compression ratio, comprising:
   a crankcase,
   a crankshaft including a crankshaft axis, said crankshaft having at least a central main portion, a crankpin and a crankshaft web located between the central main portion and the crankpin, said crankshaft being supported by the crankcase and rotatable with respect thereto about the crankshaft axis,
   at least a connecting rod including a big end and a small end,
   a piston being rotatably connected to the small end,
   a crank member being rotatably mounted on the crankpin, and comprising at least a bearing portion which is eccentrically disposed with respect to the crankpin, and having an outer circumferential wall which bears the big end of the connecting rod such that the connecting rod (11) is rotatably mounted on the bearing portion of the crank member via the big end, wherein the crank member has an external crank member gear which meshes with an external drive shaft gear which is fixed to a drive shaft that extends through the crankshaft web and has a driven portion which is located at a side of the crankshaft web which is opposite to its side where the crankpin is located,
   wherein the driven portion is drivably coupled via a first transmission to an intermediate member which is rotatably mounted to the crankshaft and rotatable with respect to the crankshaft about an intermediate member axis extending parallel to the crankshaft axis, and wherein the intermediate member is also drivably coupled to a control shaft portion of a control shaft via a second transmission which control shaft portion is located at an axial distance of the driven portion of the drive shaft and the control shaft is rotatable with respect to the crankcase about the crankshaft axis, but which has a fixed rotational position with respect to the crankcase under operating conditions at a fixed compression ratio,
   wherein the first and second transmissions are configured such and dimensions of the crank member gear and the drive shaft gear are selected such that under said operating conditions the crank member rotates at a rotation frequency with respect to the crankcase which is half of that of the crankshaft and in a same rotational direction as the crankshaft as seen from the crankcase.

2. The internal combustion engine according to claim 1, wherein the drive shaft extends through the central main portion of the crankshaft.

3. The internal combustion engine according to claim 2, wherein the drive shaft extends concentrically through the central main portion of the crankshaft.

4. The internal combustion engine according to claim 1, wherein the first transmission is formed by an external transfer gear that is fixed to a driven portion of the drive shaft at, an external rear intermediate gear that is fixed to the intermediate member and an external reverse gear which meshes with both the transfer gear and the rear intermediate gear, wherein the reverse gear is rotatably mounted to the crankshaft and rotatable with respect to the crankshaft about a reverse gear axis extending parallel to the crankshaft axis and the intermediate member axis.

5. The internal combustion engine according to claim 1, wherein the second transmission is formed by an external control member gear which is fixed to a control shaft portion of the control shaft and an external front intermediate gear that is fixed to the intermediate member and meshes with the control member gear.

6. The internal combustion engine according to claim 1, wherein the first transmission is formed by an external transfer gear that is fixed to a driven portion of the drive shaft at, an external rear intermediate gear that is fixed to the intermediate member and an external reverse gear which meshes with both the transfer gear and the rear intermediate gear, wherein the reverse gear is rotatably mounted to the crankshaft and rotatable with respect to the crankshaft about a reverse gear axis extending parallel to the crankshaft axis and the intermediate member axis, wherein the second transmission is formed by an external control member gear which is fixed to a control shaft portion of the control shaft and an external front intermediate gear that is fixed to the intermediate member and meshes with the control member gear, and wherein a gear ratio between the drive shaft gear and the crank member gear times a gear ratio between the rear intermediate gear and the transfer gear times a gear ratio between the control member gear and the front intermediate gear is 0.5.

7. The internal combustion engine according to claim 1, wherein the first transmission is formed by an external transfer gear that is fixed to a driven portion of the drive shaft at, an external rear intermediate gear that is fixed to the intermediate member and an external reverse gear which meshes with both the transfer gear and the rear intermediate gear, wherein the reverse gear is rotatably mounted to the crankshaft and rotatable with respect to the crankshaft about a reverse gear axis extending parallel to the crankshaft axis and the intermediate member axis, wherein the second transmission is formed by an external control member gear which is fixed to a control shaft portion of the control shaft and an external front intermediate gear that is fixed to the intermediate member and meshes with the control member gear, wherein the front intermediate gear and the rear intermediate gear have an equal number of teeth.

8. The internal combustion engine according to claim 7, wherein the rear intermediate gear and the front intermediate gear form a common intermediate gear.

9. The internal combustion engine according to claim 7, wherein the transfer gear and the drive shaft gear have an equal number of teeth, whereas a gear ratio between the control member gear and the crank member gear is 0.5.

10. The internal combustion engine according to claim 9, wherein the control member gear at least partly overlaps the reverse gear.

11. The internal combustion engine according to claim 1, wherein the first transmission and second transmission are located beyond the central main portion as seen from the crankshaft web, wherein the intermediate member is rotatably mounted to a wheel which is fixed to the central main portion of the crankshaft.

12. The internal combustion engine according to claim 11, wherein the wheel comprises a pulley for driving auxiliary devices of the engine, whereas the first transmission and second transmission are at least partially accommodated within the pulley.

13. The internal combustion engine according to claim 7, wherein the rear intermediate gear and the front intermediate gear form a common intermediate gear, wherein the first transmission and second transmission are located beyond the central main portion as seen from the crankshaft web, wherein the intermediate member is rotatably mounted to a wheel which is fixed to the central main portion of the crankshaft, wherein the wheel is provided with an intermediate member shaft and a reverse gear shaft which extend parallel to the crankshaft axis and to which the intermediate gear and the reverse gear are rotatably mounted, respectively.

14. The internal combustion engine according to claim 1, wherein the first transmission is formed by an external transfer gear that is fixed to a driven portion of the drive shaft at, an external rear intermediate gear that is fixed to the intermediate member and an external reverse gear which meshes with both the transfer gear and the rear intermediate gear, wherein the reverse gear is rotatably mounted to the crankshaft and rotatable with respect to the crankshaft about a reverse gear axis extending parallel to the crankshaft axis and the intermediate member axis, wherein the second transmission is formed by an external control member gear which is fixed to a control shaft portion of the control shaft and an external front intermediate gear that is fixed to the intermediate member and meshes with the control member gear, wherein the first transmission comprises at least another intermediate member including an external front intermediate gear and rear intermediate gear and another external reverse gear, wherein said rear intermediate gear and said another external reverse gear also mesh with the transfer gear, and said front intermediate gear meshes with the control member gear.

15. The internal combustion engine according to claim 1, wherein the first transmission comprises an endless member through which the intermediate member and the driven portion are coupled, whereas the second transmission is formed by an external control member gear which is fixed to the control shaft portion of the control shaft and an external front intermediate gear that is fixed to the intermediate member and meshes with the control member gear, or wherein the first transmission is formed by an external transfer gear which is fixed to a driven portion of the drive shaft and an external rear intermediate gear that is fixed to the intermediate member and meshes with the transfer gear, whereas the second transmission comprises an endless member through which the intermediate member and the control shaft portion are coupled.

* * * * *